United States Patent
Tata et al.

(10) Patent No.: US 12,293,598 B2
(45) Date of Patent: May 6, 2025

(54) ENTITY EXTRACTION VIA DOCUMENT IMAGE PROCESSING

(71) Applicant: ACCENTURE GLOBAL SOLUTIONS LIMITED, Dublin (IE)

(72) Inventors: Swati Tata, Bangalore (IN); Anjani Kumari, Jharkhand (IN); Abhishek Singh, Jharkhand (IN); Kavita V V Ganeshan, Mumbai (IN); Omar Razi, Bengaluru (IN); Prakhar Gupta, Meerut (IN); Achal Gambhir, Bangalore (IN); Ranjan Sarmah, Assam (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 297 days.

(21) Appl. No.: 17/987,969

(22) Filed: Nov. 16, 2022

(65) Prior Publication Data

US 2024/0161528 A1  May 16, 2024

(51) Int. Cl.
*G06K 9/00* (2022.01)
*G06V 30/186* (2022.01)
(Continued)

(52) U.S. Cl.
CPC .......... *G06V 30/412* (2022.01); *G06V 30/186* (2022.01); *G06V 30/19153* (2022.01); *G06V 30/19167* (2022.01)

(58) Field of Classification Search
CPC ............... G06V 30/412; G06V 30/186; G06V 30/19153; G06V 30/19167
See application file for complete search history.

(56) References Cited

U.S. PATENT DOCUMENTS 9,430,558 B2    8/2016  Bhat et al.
11,893,012 B1 *  2/2024  Appalaraju .............. G06N 3/08
(Continued)

FOREIGN PATENT DOCUMENTS

EP      2884425 A1 *  6/2015  ............ G06F 40/14
KR  101215948 B1 *  12/2012
(Continued)

OTHER PUBLICATIONS

What is Azure form Recognizer?, Microsoft.com, Nov. 8, 2022, pp. 1-7 (Year: 2022).*

(Continued)

*Primary Examiner* — Jayesh A Patel
(74) *Attorney, Agent, or Firm* — Mannava & Kang, P.C.

(57) ABSTRACT

A document processing system processes a document image to identify document image regions including floating images, structured data units, and unstructured floating text. A first masked image is generated by deleting any floating images from the document image and a second masked image is generated by deleting any structured data units from the first masked image. The structured data units and the unstructured floating text are thus identified serially one after another. Textual data is extracted from the structured data units and the unstructured floating text by processing the corresponding document image regions via optical character recognition (OCR). Entities are extracted from the textual data using natural language processing (NLP) techniques.

20 Claims, 16 Drawing Sheets

(51) Int. Cl.
 *G06V 30/19* (2022.01)
 *G06V 30/412* (2022.01)

(56) References Cited

U.S. PATENT DOCUMENTS

| | | | |
|---|---|---|---|
| 2015/0169510 A1* | 6/2015 | Dejean | G06F 40/14 |
| | | | 715/229 |
| 2016/0104077 A1 | 4/2016 | Jackson, Jr. et al. | |
| 2018/0189950 A1* | 7/2018 | Norouzi | G06T 7/11 |
| 2019/0114360 A1* | 4/2019 | Garg | G06F 16/1794 |
| 2019/0354818 A1* | 11/2019 | Reisswig | G06N 3/04 |
| 2020/0184267 A1* | 6/2020 | Kumar | G06F 40/284 |
| 2022/0292258 A1* | 9/2022 | Zeng | G06V 30/413 |
| 2023/0084845 A1* | 3/2023 | Lu | G06N 20/00 |
| | | | 382/176 |

FOREIGN PATENT DOCUMENTS

| | | | | |
|---|---|---|---|---|
| WO | WO-2017079357 A1 * | 5/2017 | | G06F 3/04817 |
| WO | WO-2019212874 A1 * | 11/2019 | | G06F 16/3344 |
| WO | WO-2020117649 A1 * | 6/2020 | | G06K 9/6218 |

OTHER PUBLICATIONS

Benno Kruit, et al; Extracting Novel Facts from Tables for Knowledge Graph Completion, (Extended version); Jul. 15, 2019; pp. 18.
Benno Kruit, et al; Tab2Know: Building a Knowledge Base from Tables in Scientific Papers; Jul. 28, 2021; pp. 17.
Dominique Ritze, et al; Matching HTML Tables to DBpedia; pp. 6.
https://learn.microsoft.com/en-us/azure/applied-ai-services/form-recogni . . . ; What is Azure Form Recognizer—Azure Applied AI Services; pp. 7.
Ziqi Zhang; Effective and Efficient Semantic Table Interpretation using TableMiner+ ; pp. 39.

* cited by examiner

1100

| MARY DOE | YEAR............: | 2020 |
| D.N.I./C.I.F.: 4579397423 | DATE............: | 05/05/2020 |
| 400 WASHINGTON DRIVE | INVOICE........: | 11111111/ 2020 |
| PENNSYLVANIA | | |
| 555 854 2020 | | |

LOREM IPSUM DOLOR SIT AMET, CONSECTETUR

ADIPISCING ELIT, SED DO EIUSMOD TEMPOR INCIDIDUNT UT LABORE ET DOLORE MAGNA ALIQUA.

LOREM IPSUM DOLOR     N.I.F.: A48484565456

| TYPE OF OPERATION | DATE | AMOUNT | % | COPAY |
|---|---|---|---|---|
| CREDIT | 01/01/2020 | 1,200,000.00 | 20.00 | 590 |
| CONSOLIDATION | | | | |

| LOREM | AMOUNTS | NO SUBJECT |
|---|---|---|
| CONSECTETUR | 10 | 5 |
| IPSUM | 10 | 5 |
| COPAY | 80 | 590 |

| | | | |
|---|---|---|---|
| | IMPORTANT ROUGH TOTAL | 590 | 0.00 |
| | | SUB-TOTAL: | 600 |
| | | EXTRA: | 0 |
| LOREM IPSUM: | 100 AT 15% | SERVICES: | 0 |
| DOLOR SIT: | 100 AT 20% | FEES: | |
| | | TOTAL: | 600 |

LOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD EXERCITATION ULLAMCO LABORIS NISI UT ALIQUIP EX EA COMMODO CONSEQUAT.

1102

OVERSEEN BY NOTARY MARY DOE

```
MARY DOE                                             2020
D.N.I./C.I.F.: 4579397423                      05/05/2020
400 WASHINGTON DRIVE                        11111111/ 2020
PENNSYLVANIA
555 854 2020

LOREM IPSUM DOLOR SIT AMET, CONSECTETUR

ADIPISCING ELIT, SED DO EIUSMOD TEMPOR
INCIDIDUNT UT LABORE ET DOLORE MAGNA
ALIQUA.
LOREM IPSUM DOLOR              N.I.F.: A48484565456
```

| TYPE OF OPERATION | DATE | AMOUNT | % | COPAY |
|---|---|---|---|---|
| CREDIT | 01/01/2020 | 1,200,000.00 | 20.00 | 590 |
| CONSOLIDATION | | | | |

| LOREM | AMOUNTS | NO SUBJECT |
|---|---|---|
| CONSECTETUR | 5 | |
| IPSUM | 5 | |
| COPAY | 590 | |

```
         IMPORTANT ROUGH TOTAL        0.00          590
                                      SUB-TOTAL:    600
                                      EXTRA:          0
LOREM IPSUM:          100 AT 15%      SERVICES:      0
DOLOR SIT:            100 AT 20%      FEES:

TOTAL:        600
```

LOREM IPSUM DOLOR SIT AMET, CONSECTETUR ADIPISCING ELIT, SED DO EIUSMOD
TEMPOR INCIDIDUNT UT LABORE ET DOLORE MAGNA ALIQUA. UT ENIM AD MINIM VENIAM,
QUIS NOSTRUD EXERCITATION ULLAMCO LABORIS NISI UT ALIQUIP EX EA COMMODO
CONSEQUAT.

OVERSEEN BY NOTARY MARY DOE

FROM FIG.11A 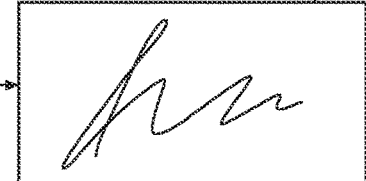

FIG. 11A (CONT.)

MARY DOE 2020 1104
D.N.I./C.I.F.: 4579397423 05/05/2020
400 WASHINGTON DRIVE 11111111/ 2020
PENNSYLVANIA
555 854 2020
LOREM IPSUM DOLOR SIT AMET, CONSECTETUR

ADIPISCING ELIT, SED DO EIUSMOD TEMPOR INCIDIDUNT UT LABORE ET DOLORE MAGNA ALIQUA.
LOREM IPSUM DOLOR     N.I.F.: A48484565456

1112:

| TYPE OF OPERATION | DATE | AMOUNT | % | COPAY |
|---|---|---|---|---|
| CREDIT | 01/01/2020 | 1,200,000.00 | 20.00 | 590 |
| CONSOLIDATION | | | | |

| LOREM | AMOUNTS | NO SUBJECT |
|---|---|---|
| CONSECTETUR | 5 | |
| IPSUM | 5 | |
| COPAY | 590 | |

IMPORTANT ROUGH TOTAL       0.00       590
                            SUB-TOTAL:  600
                            EXTRA:      0
LOREM IPSUM:    100 AT 15%  SERVICES:   0
DOLOR SIT:      100 AT 20%  FEES:       0
                            TOTAL:      600

LOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD EXERCITATION ULLAMCO LABORIS NISI UT ALIQUIP EX EA COMMODO CONSEQUAT.

OVERSEEN BY NOTARY
MARY DOE

1114:

| TYPE OF OPERATION | DATE | AMOUNT | % | COPAY |
|---|---|---|---|---|
| CREDIT | 01/01/2020 | 1,200,000.00 | 20.00 | 590 |
| CONSOLIDATION | | | | |

1116:

| LOREM | AMOUNTS | NO SUBJECT |
|---|---|---|
| CONSECTETUR | 5 | |
| IPSUM | 5 | |
| COPAY | 590 | |

1118:

| | | SUB-TOTAL: | 600 |
|---|---|---|---|
| | | EXTRA: | |
| LOREM IPSUM: | 100 AT 15% | SERVICES: | 0 |
| DOLOR SIT: | 100 AT 20% | FEES: | 0 |
| | | TOTAL: | 600 |

```
MARY DOE                              YEAR.........:           2020
D.N.I./C.I.F.: 4579397423             DATE.........:       05/05/2020
400 WASHINGTON DRIVE                  INVOICE......:    11111111/ 2020
PENNSYLVANIA
555 854 2020
LOREM IPSUM DOLOR SIT AMET, CONSECTETUR

ADIPISCING ELIT, SED DO EIUSMOD TEMPOR
INCIDIDUNT UT LABORE ET DOLORE MAGNA
ALIQUA.
LOREM IPSUM DOLOR                           N.I.F.: A48484565456

IMPORTANT ROUGH TOTAL            590         0.00
```

LOREM IPSUM DOLOR SIT AMET, CONSECTETUR ADIPISCING ELIT, SED DO EIUSMOD TEMPOR INCIDIDUNT UT LABORE ET DOLORE MAGNA ALIQUA. UT ENIM AD MINIM VENIAM, QUIS NOSTRUD EXERCITATION ULLAMCO LABORIS NISI UT ALIQUIP EX EA COMMODO CONSEQUAT.

TO FIG. 11C CONT.

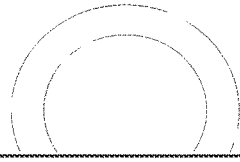

OVERSEEN BY NOTARY MARY DOE

*FIG. 11C*

ENTITY EXTRACTION VIA DOCUMENT IMAGE PROCESSING

BACKGROUND

Various techniques exist for automating data extraction from printed or written text from a scanned document or image file and then converting the text into a machine-readable form to be used for data processing tasks such as editing or searching. Image files such as an image-based portable document format (PDF), Tag Image File Format (TIFF), or Joint Photographic Experts Group (JPG) are converted into a text-based machine-readable file for textual data extraction. Currently, existing textual data extraction systems implementing techniques such as optical character recognition (OCR) are capable of producing a high degree of recognition accuracy for most fonts which are now common and support a variety of digital image file formats. However, some disadvantages of existing text extraction techniques include the limitations that creep in due to the image quality of the documents, as a result of which the extracted textual data may be prone to errors requiring further proofreading.

BRIEF DESCRIPTION OF DRAWINGS

Features of the present disclosure are illustrated by way of examples shown in the following figures. In the following figures, like numerals indicate like elements, in which:

FIG. 11A shows floating image extraction in accordance with the examples disclosed herein.

FIG. 11B shows the extraction of structured data units in accordance with the examples disclosed herein.

DETAILED DESCRIPTION

Figure 1:
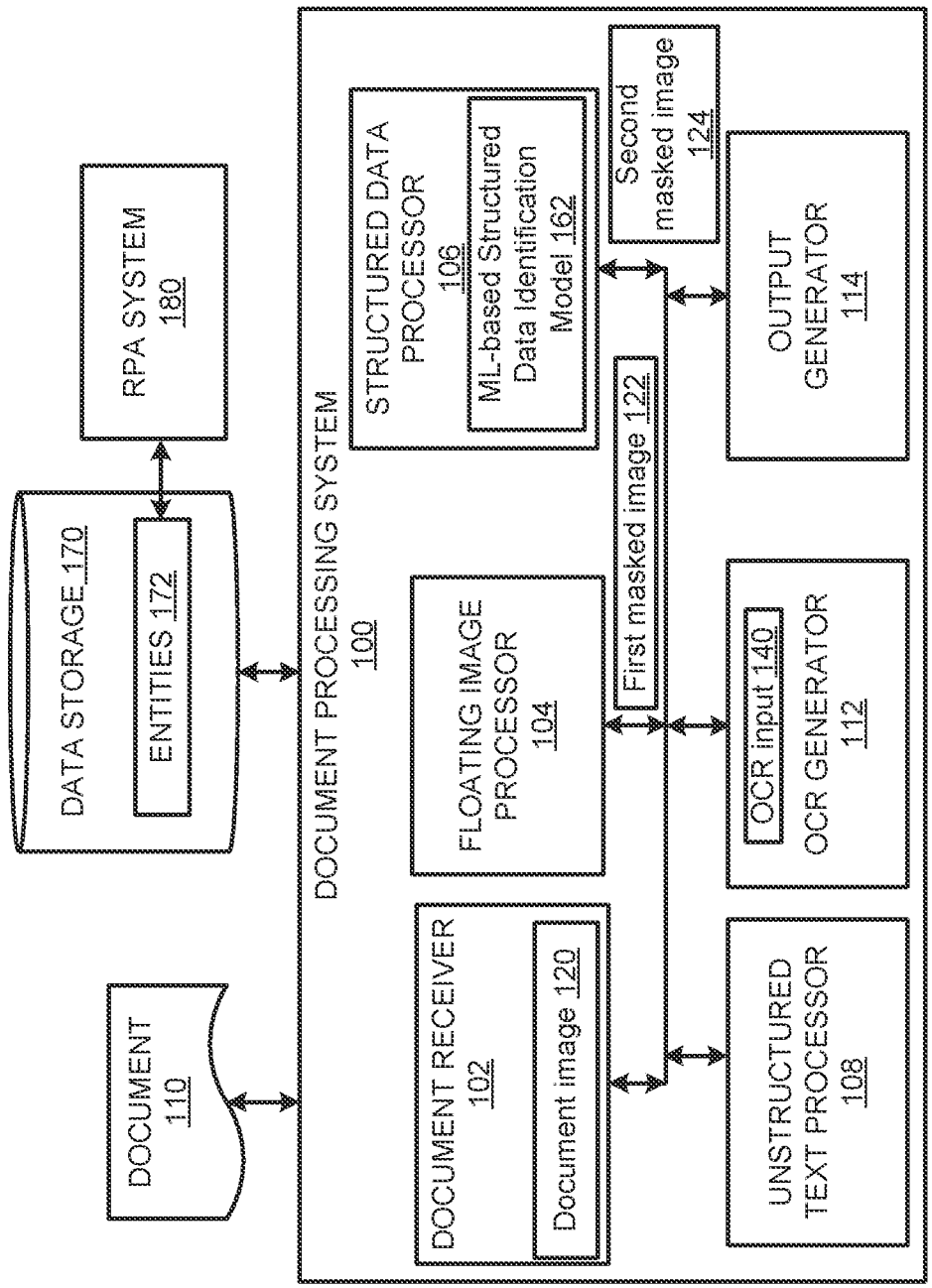
FIG. 1 shows a block diagram of a document processing system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

A document processing system that extracts entities from documents in a stepwise process is disclosed. A document that is processed by the disclosed document processing system may include one or more data units of different types wherein each data unit may further include one or more data fields/entities of different data formats. Examples of different data units may include floating images, structured data units, and unstructured floating text. Floating images may include images of signatures, stamps, logos, images of objects, etc., that may be positioned within any portion of the document. Structured data units can include forms or bodies of organized data such as but not limited to, tables, lists, headers, footers, etc. Unstructured floating text can include chunks of text, formatted as phrases, sentences, or paragraphs. The document processing system initially analyzes an image of the document, to identify and extract floating images. The remaining portions of the document which do not include the floating images are further analyzed for entity extraction. The remaining portions of the document image other than those including the floating images are further analyzed to identify one or more structured data units. In an example, a machine learning (ML) based structured data identification model is used for identifying one or more structured data units from the remaining portions of the document image. Finally, the unstructured floating text can be identified after the structured data units are identified and extracted.

In an example, the connected components methodology is implemented to identify the floating images from the document image. The document image is therefore divided into a series of sub-graphs including groups of pixels. The area occupied by a pixel group is determined and compared with a learnable threshold. If the area is greater than the threshold, the subgraph or the group of pixels is determined to represent a floating image. A single process can detect both signatures and logos and the detection is independent of shape, size, color, and placement of the floating image on a page of the document.

The structured data identification model can be configured to identify distinct forms of the tables such as a bordered table, semi-bordered table, and a borderless table. In an example, the structured data identification model can include a convolution neural network (CNN) trained on labeled training data including bordered tables, semi-bordered tables, and borderless tables to identify distinct structured data units. The convolutions are applied to the regions that remain after the floating images have been discarded from processing and region-wise feature extraction is performed through pooling. Predictions for cell regions among the bordered, borderless or semi-bordered tables are thus obtained. In an example, the structured data identification model can be trained via supervised learning via explicitly labeled data to process different types of tables differently so that the optimal cell boundaries are identified and column splits can be detected at each row. The structured data identification model can further utilize transfer learning to maximize information utilization and minimize re-training requirements. Again, the structured data identification model can be configured for identifying varied structures including bordered, semi-bordered, borderless, multi-page, multi-row, and multi-column tables. The structured data identification model can work effectively irrespective of structure shape, size, wrapped around text/non-text, etc. The structured data identification model is also capable of detecting structured data units regardless of color, font, language, etc.

Upon identifying the structured data units from the document image, a masked document image is generated wherein the portions of the document image including either the floating images or structured data units are masked. The remaining portions further analyzed to determine if they include unstructured floating text. In an example, techniques such as Gaussian blur can be applied to remove noise. Additionally, image boundaries can be dilated by adding pixels. Contours of the unstructured floating text units or unstructured text segments, wherein each unstructured text unit contains one or more words, can thus be detected.

Upon identifying the various data units, the document text from the various document image regions including the structured data units and the unstructured floating text can be extracted by providing the image regions including the data units to an optical character recognition (OCR) engine. In an example, an OCR engine customized for a particular language or domain may be selected for text extraction from the document image. The OCR engine may extract text from left to right. However, as the text is extracted from the document image regions within the context of the structured data units and/or unstructured floating text and in the absence of noise such as floating images, the OCR input obtained may have greater accuracy as compared to the OCR input that would have been obtained by providing the document image as a single unit. The OCR input can be normalized and Natural Language Processing (NLP) techniques can be used for extracting entities from the normalized OCR input. In an example, the extracted entities can be provided to downstream systems (e.g., Robotic Process Automation (RPA) systems) for the execution of various automated processes.

The disclosed document processing system enables a more accurate entity extraction by converting a document into an image format, identifying the various structured data units and unstructured floating text along with position coordinates. Noise such as floating images is removed using graphical methods such as connected components process as opposed to using Artificial Intelligence (AI) techniques. This is because, floating images such as signatures, stamps, logos, etc., can be of a large variety and may not have a fixed location/position across different documents. For example, signatures may be found in various locations of a document, e.g., in the beginning, middle, or at end of the document. The shape and size may also vary based on the document supplier, page size, signing authority, individual's signature style, etc. Hence, it is infeasible to train neural networks to accurately identify floating images across various documents as training a neural network to identify such varied data units, would necessitate collecting a large quantum of training data. Moreover, data specific to a document may not qualify for the deep learning network's training criteria such as the number of samples, annotation, or quality of the scan. Instead employing statistical methods such as connected components procedure simplifies the process. Identification, retrieval, and removal of floating images from further processing minimize their interference with the textual interpretation of the document.

Structured data units such as tables are a natural way of arranging structured data. However, the presence of a table on a document page blended or overlapping with other parts makes it difficult to detect the tables automatically. Moreover, tables are of different formats such as bordered, semi-bordered, and borderless with variations in styles, fonts, colors, etc. Also, the quality and orientation of scans play a major role in detection accuracy. By implementing a transfer learning approach with the structured data identification model, the amount of required annotated data can be minimized. Identification, retrieval, and removal of structured data units minimize duplication and interference with the extraction of remaining textual units.

Apart from images and structured units, the document may contain floating text segments like individual words, titles, key-value pairs, sentences, and paragraphs. The left-to-right character detection of these textual units by the OCR engines with no logical boundaries often results in gibberish textual outputs. The text spill algorithm implemented by the document processing system tightly couples the chain boundary of words to create a single logical boundary. Instead of a single left-to-right coupling of line/sentence, the individual textual units are identified from the corresponding document image regions including the unstructured floating text, and divided along the logical boundaries defined by the image regions. The logical boundaries provide a semantic context. Interpretation of text inside these logical text boundaries preserves their semantic meaning. Mapping the appropriate image/table enhances structured/unstructured data understanding. The document processing system, therefore, enables a more accurate textual data extraction along logical boundaries when different types of data is found in a single page of a document thereby leading to better entity identification than would be enabled by text extracted without considering the logical boundaries.

2. System Architecture

FIG. 1 shows a block diagram of a document processing system 100 in accordance with the examples disclosed herein. The data processing system 100 receives or accesses a document 110, extracts entities 172 from the document 110, and stores the extracted entities 172 in machine-consumable form so that downstream systems e.g., a robotic process automation (RPA) system 180 can use the entities 172 to execute various automatic processes. In particular, the data processing system 100 is configured for step-wise extraction of the entities 172. The data processing system 100 includes a document receiver 102, a floating image processor 104, a structured data processor 106, an unstructured text processor 108, and an output generator 114.

In an example, the document 110 can be annotated manually or automatically so that different data fields in the document 110 from which the entities are to be extracted can be marked. In case no fields are annotated, entities may be extracted from all the identified data units. In an example, the document 110 can include a plurality of data units of different formats wherein a data unit may include one or more data fields which may be identified as the entities 172. For example, data units in image formats can include signatures, logos, stamps, etc., while data units in textual format can include tables, text snippets, etc. In another example, a textual data unit can include multiple data fields for item numbers, item names, amounts, currencies, etc. For example, the document 110 can include a contract with textual data clumped together (e.g., in clauses and sub-clauses), an invoice, a bank statement or a financial report with a combination of unstructured text and tabular data, a poster or a flyer with images interspersed with textual data, a patent document or engineering drawing with formal diagrams labeled with textual data, etc. The data processing system 100 is configured to identify data units of different formats from the document image 120 and process them so that one data unit does not interfere with the extraction and interpretation of other data units. Furthermore, while the documents received by the data processing system 100 may have similar data units, they may not be homogeneous as the different fields may be arranged at different positions within the documents. For example, one contract may have a logo at the top left side of the document while another contract may have a logo at the top center of the document. Therefore, images, such as logos, handwritten signatures, stamps, watermarks, etc., are referred to herein as floating images. While the positions of floating images may be recorded but not further processed, the tabular forms in different bank statements can be processed for entity extraction, and finally, unstructured text can be extracted from the document image 120. The entities 172 are extracted, not only by applying natural language processing (NLP) techniques to the textual data extracted from the document 110 but also by mapping the extracted textual data to corresponding positions of the textual data in the document 110.

The document 110 is initially accessed or received by the document receiver 102 which determines the format of the document 110. If the document 110 is received as an image i.e., the document file is given an image format, e.g., jpeg, .gif, etc., the document 110 may be further processed for entity extraction. If the document 110 is not in an image format, the document receiver 102, converts the document 110 into an image format to generate the document image 120. The conversion enables the data processing system 100 to not only extract the textual data from the document 110 but also to determine the position of the textual data in the document 110. The stepwise processing enables the data processing system 100 to de-clutter the document 110 thereby enabling a more accurate entity extraction.

In an example, the document image 120 can be provided to the floating image processor 104. As mentioned above, the positions of the floating images cannot be predetermined within the document 110 (and therefore within the document image 120) and neither do the floating images have any predefined shape or size. The shape and size vary based on the document supplier, page size, etc. If the floating image is a signature, the shape and size of the floating image may also vary with the signing authority and an individual's signature style. In certain instances the floating images may overlap with each other e.g., a signature may overlap with a stamp or a watermark. Furthermore, document-specific data within the floating images may not possess sufficient quality (e.g., number of training samples, annotations, quality of the scan, etc.) to be processed for entity extraction by deep learning networks. Therefore, the floating image processor 104 implements a statistical process, i.e., a connected components process as detailed further infra for identifying the floating image shape(s). Upon identifying the shape(s) and position(s) of the floating image(s), a first masked image 122 which is a version of the document image 120 is produced wherein the floating image(s) are masked. The floating images may therefore be discarded from further processing to minimize the interference of floating images with the textual interpretation of the document 110.

The structured data processor 106 employs an ML-based structured data identification model 162, to identify and extract structured data forms such as tables, lists, headers, footers, etc., from within the document image 120. The structured data identification model 162 is configured to process tables in different pipelines so that tables of different structures e.g., bordered tables, semi-bordered tables, and borderless tables are processed in different pipelines, thereby increasing the accuracy of data extraction from the tables. In an example, the structured data processor 106 can implement transfer learning for training the structured data identification model 162. Using the transfer learning approach, an ML model developed for a task can be used as the starting point for another model employed for another task. Therefore, pre-trained models can be used as a starting point and customized for specific tasks. The structured data identification model 162 can be configured for automatic identification and segmentation of multiformat tables that may be included in a single page or may be split across multiple pages of the document 110. Identification, retrieval, and removal of structured data units from further processing can minimize duplication and interference with the extraction of entities from the remaining textual data units. The structured data processor 106 identifies the positions of individual cells of the different structured data forms e.g., tables or individual items in a list thereby enabling entity extraction from such tables. Upon identifying the position(s) of the structured data units, another masked version of the document image 120 i.e., the second masked image 124 is produced wherein the structured data units are masked.

The portions of the document image 120 that remain after the removal of the structured data forms or structured data units are processed by the unstructured text processor 108. Apart from the floating images and the structured data units, the document 110 may also contain floating text segments such as individual words, sentences, or paragraphs. The unstructured text processor 108 implements a text spill procedure that identifies and creates a single logical boundary of words. In accordance with the text spill method, the inverted binary image undergoes dilation with a variable filter size in several iterations. The iterations aim to join the disparate floating text segments until no further text boundaries merger is detected. The filter size depends on the regular shaped boundary (e.g., a quadrilateral) around each individual word. Thus, the volume dependent dilation filter leads to large dilation on text portions with larger font size/bold texts/large words (text segments having heavy ink flow) and light dilation on smaller words (text segments with light ink flow). This inherently enhances bond between floating text elements with single logical boundary while reducing interference or merger of text boundaries from two different floating segments.

Therefore, instead of left-to-right coupling of lines/sentences, the unstructured text processor 108 identifies and divides individual textual units along logical boundaries. By identifying the proper boundaries of different floating textual units instead of the rigid left-to-right coupling of sentences, the unstructured text processor 108 maintains the spatial relation between the different textual units within the documents 110. For example, if the document 110 includes a chunk of text, divided into multiple paragraphs, wherein each paragraph with a plurality of lines is arranged one below the other in multiple columns on the document 110, the text spill procedure enables the unstructured text processor 108 to identify the sentence breaks between the columns of text rather than identifying the text from straddling multiple columns in a single sentence.

On extraction of the regions of structured data units and unstructured text units, the OCR generator 112 generates the OCR input 140 from the corresponding regions of document image 120. In an example, the OCR generator 112 may transmit the different regions of the document image 120 to a selected, external OCR engine (not shown) for the generation of the OCR input 140. Accordingly, the OCR input 140 can be obtained for different regions including the structured data units and the unstructured text units of the document image 120 while the floating images are omitted from the OCR input extraction process.

The OCR input 140 based on a semantic context derived from logical boundaries defined by the corresponding document image regions is provided to the output generator 114. The structured data processor 106 provides regions where structured data such as tables are included in the document image 120. The unstructured text processor 108 provides regions of floating text including unstructured text units. The output generator 114 maps positions on the document image 120 corresponding to the textual output provided by the OCR engine. The output generator 114 is therefore configured for structured interpretation when the text is arranged in the document 110 in the form of rows and columns of structured data forms or floating text. The output generator 114, therefore, employs the particular region or position of the text in the document image 120 to determine the content and meaning of the textual data. Beyond the detection of the tables, the output generator 114 receives data regarding the row-column structure of the tables. In addition, the output generator 114 can use the generic/business rules, and along with structure headers, titles, captions to provide semantic descriptions for entities. The output generator 10 may also implement generic transformations for enhanced representations of entities such as date/time, currencies, addresses, etc. The entities 172 thus extracted can be stored in the data store 170 or provided to the RPA system 180 for executing downstream processes.

Figure 2:
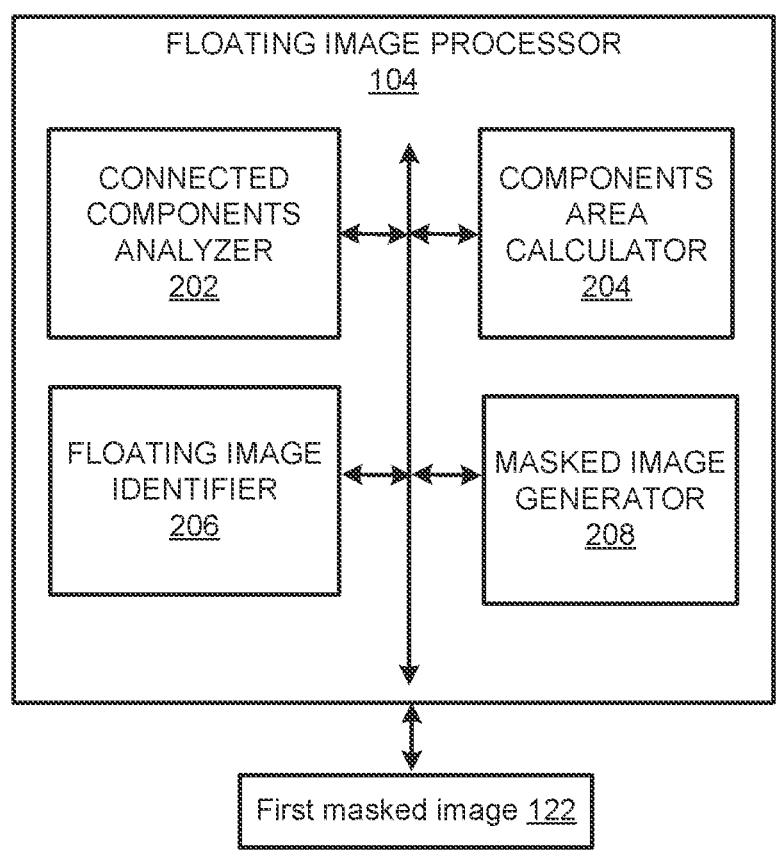
FIG. 2 shows a block diagram of a floating image processor in accordance with the examples disclosed herein.

FIG. 2 shows a block diagram of the floating image processor 104 in accordance with the examples disclosed herein. The floating image processor 104 includes a connected components analyzer 202, a component area calculator 204, a floating image identifier 206, and a masked image generator 208. The floating image processor 104 is configured for floating image detection and removal, wherein the connected components analyzer 202 treats the document image 120 as an undirected graph and different portions of the document image 120 including pixel information as sub-graphs of the document image 120. A component of an undirected graph is a connected subgraph that is not part of any larger connected subgraph. The components area calculator 204 programmatically obtains the areas of various sub-graphs or the extent of the pixels forming the various sub-graphs. The floating image identifier 206 compares the area of different sub-graphs with a predetermined threshold area. In an example, the floating image identifier 206 can include an ML unit such as a classifier that learns a threshold to be applied for area determination for floating image identification. The sub-graphs with areas greater than the predetermined threshold can be identified as including floating images. In an example, the floating image identifier 206 outputs position coordinates of the sub-graphs including floating images so that the floating images are discarded from further processing. Based on the position coordinates output by the floating image identifier 206, the masked image generator 208 may mask the pixels in the document image 120 located at the coordinates output by the floating image identifier 206 to generate the first masked image 122. Implicit or explicit feedback regarding the accuracy of the floating image identification can be used in adjusting the threshold for the area determination.

Figure 3:
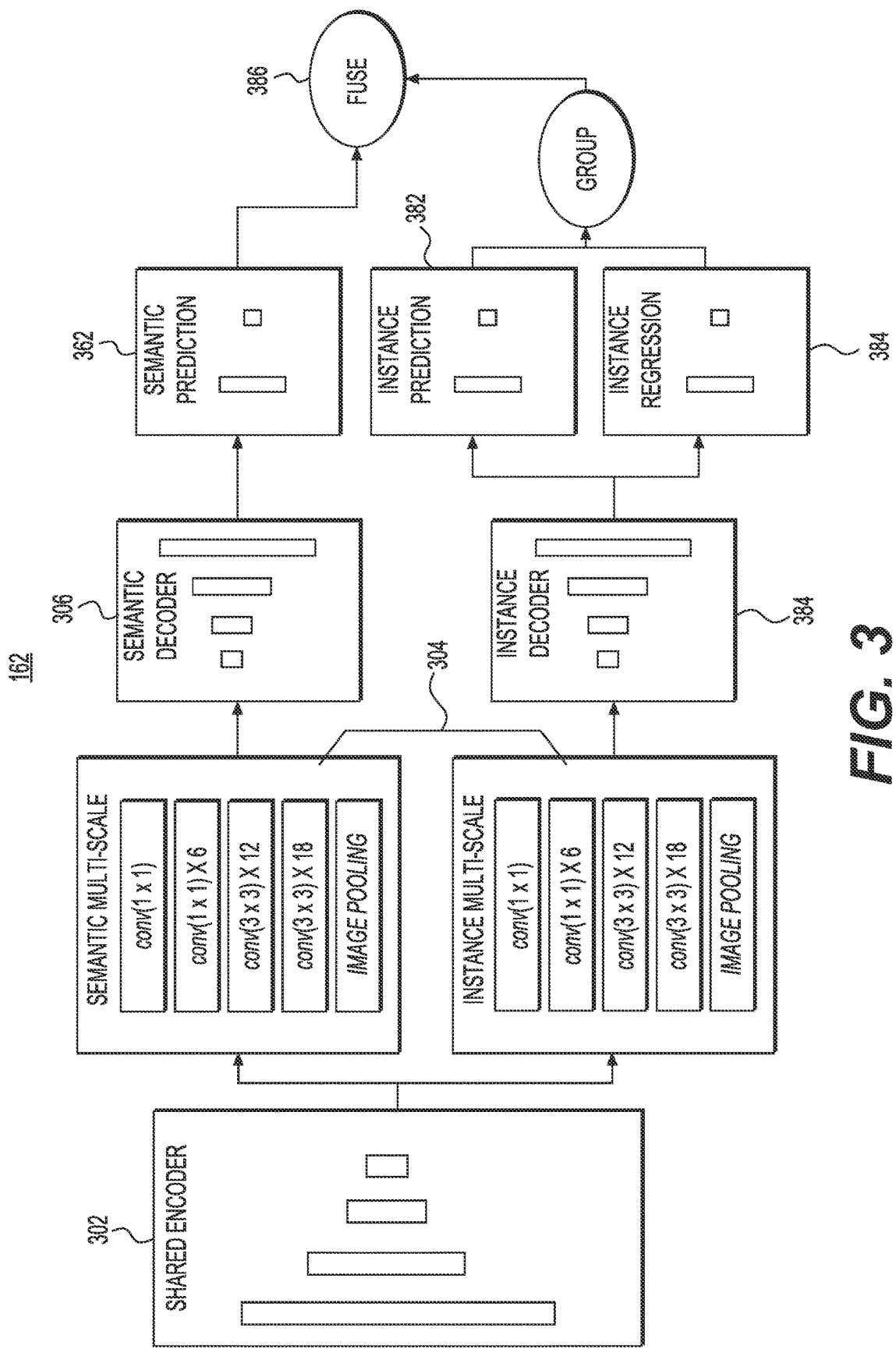
FIG. 3 shows a block diagram of an ML-based structured data identification model in accordance with the examples disclosed herein.

FIG. 3 shows a block diagram of the structured data identification model 162 in accordance with the examples disclosed herein. The structured data identification model 162 includes an object detection model e.g., a region-based CNN capable of identifying different types of structures such as but not limited to, bordered tables, semi-bordered tables, borderless tables, multi-page tables, multi-row and/or multi-column tables irrespective of the shape, size, wrapped around text, non-text, etc. Based on the type of table identified, the cell boundary can be identified from the document image 120 The region-based CNN includes a shared encoder 302 where shared weights minimize the number of tunable parameters leading to reduced memory footprint and accelerated training and inference. The shared encoder is followed by multiple convolutional layers 304. A semantic decoder 306 enables independent semantic predictions 362 that enhances the model classification mechanism to identify if the document image 120 contains a structured data unit. The semantic decoder 306 is used for different table structures that may need to be identified from the document 110 such as bordered, semi-bordered and borderless, multi-column, and/or multipage formats. In an example, a region-based CNN can be used for the identification of different kinds of tables which are processed via different pipelines. In this instance, a pipeline can refer to different post-processing rules for extraction and preservation of varied tabular structures (bordered, semi-bordered, and borderless). A multi-page table may be identified based on the extraction of column headers from the first page of the document 110 and the absence of the column headers on subsequent pages of the document 110. The instance decoder 308 provides instance predictions 382 regarding the tabular cell structures present inside a given image region. While bordered and semi-bordered table structures undergo edge detection techniques for detecting the visible table/cell boundaries, the output from instance regression 384 is used for semi-bordered and borderless structures where an apparent boundary is missing. In an example, the instance regression 384 maps the predicted tabular cell structure coordinates with the document image 120. The information from semantic prediction 362, instance prediction 382, and instance regression 384 are fused 386 to enhance the accuracy with minimum Intersection over Union (IoU) thresholding. On a hierarchical level, a true value in semantic prediction indicating presence of a structured data should have at least one respective true value in the instance prediction 382 with respective boundaries identified in the instance regression 384. In a fuse operation, the grouped output from the instance prediction 382 and the instance regression 384 are validated against values from semantic prediction to discard any erroneous outputs. Here, the IoU refers to a metric evaluated on the boundaries of different cells predicted by the instance regression 384. A minimum IoU threshold value ensures that no two cell predictions with more than threshold overlapping region are considered separately in a tabular structure as they will effectively be enclosing the same content twice.

The structured data processor 106 may also include a masked image generator (not shown) which is configured to generate the second masked image 124 by masking pixels in the first masked image 122 located at positions wherein the structured data units are identified.

Figure 4:
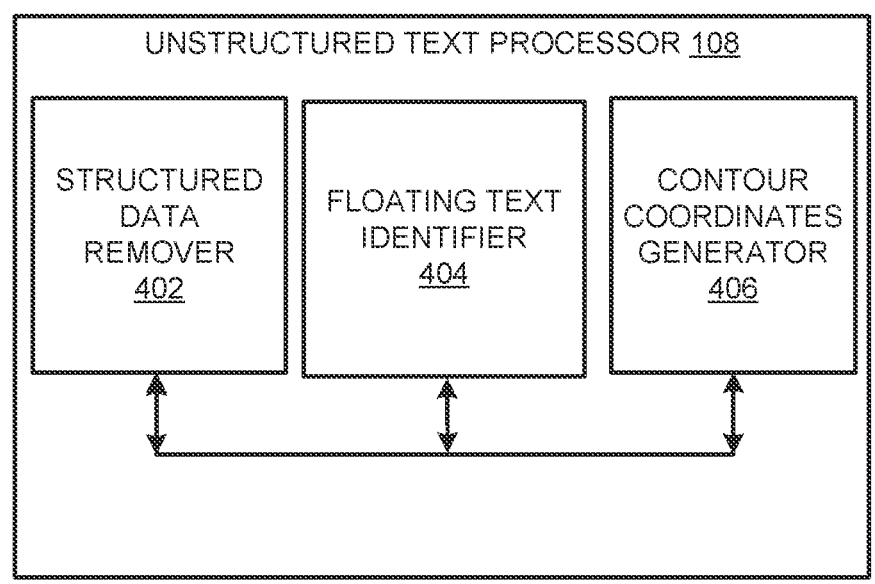
FIG. 4 shows a block diagram of an unstructured text processor in accordance with the examples disclosed herein.

FIG. 4 shows a block diagram of the unstructured text processor 108 in accordance with the examples disclosed herein. The unstructured text processor 108 includes a structured data remover 402, a floating text identifier 404 and a contour coordinates generator 406. The coordinates of the tabular cell structures from the structured data identification model 162 are received by the structured data remover 402 which enables the selection of remaining portions of the document image 120 other than the image regions including the floating image(s) and the structured data form(s) which are to be disregarded from further processing. The floating text identifier 404 delineates the contours of the textual data units within the unstructured text. The contour coordinates generator 406 generates the position coordinates of the contours/outlines of the textual data units within the document image 120.

Figure 5:
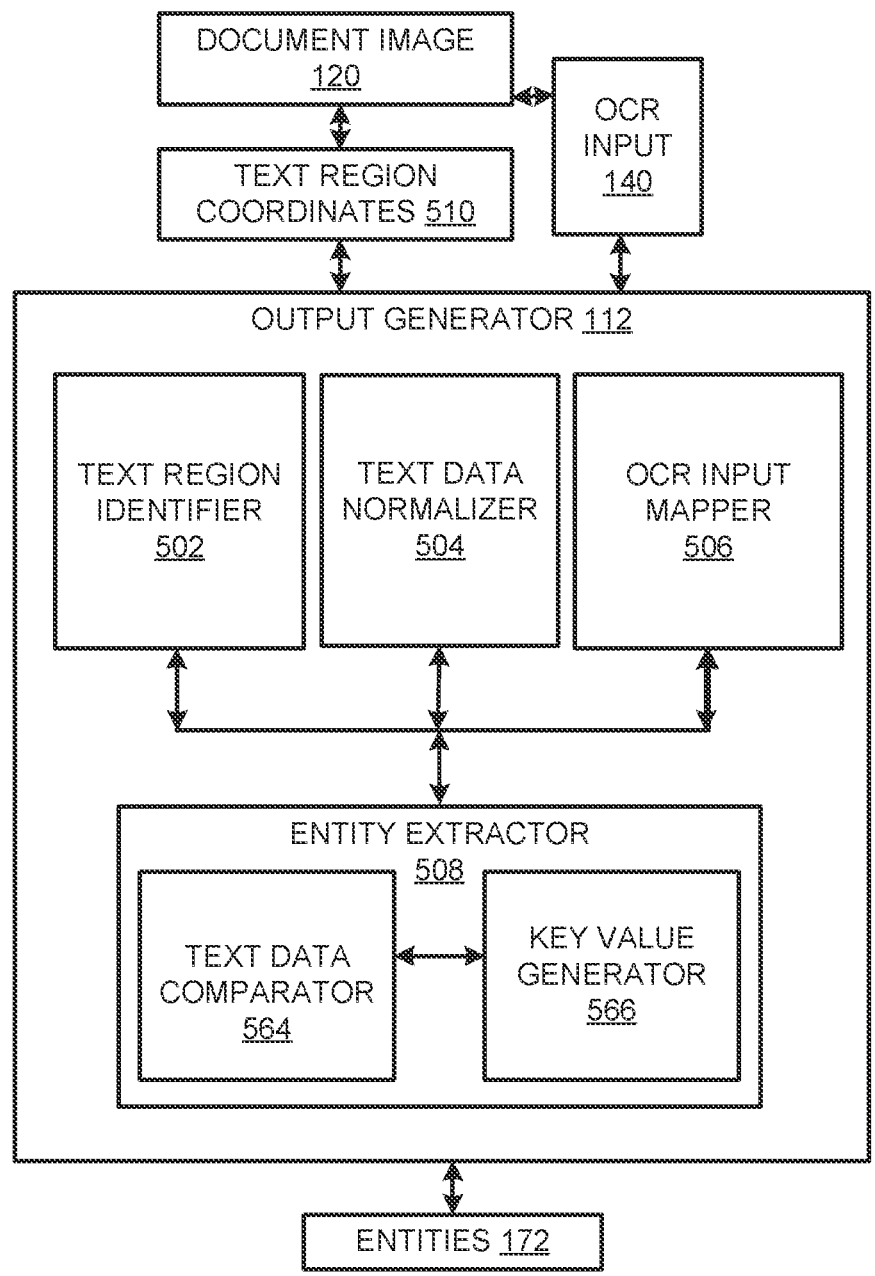
FIG. 5 shows a block diagram of an output generator in accordance with the examples disclosed herein.

FIG. 5 shows a block type of output generator 114 in accordance with the examples disclosed herein. The text region coordinates 510 or the position coordinates of the various data units within the document image 120 obtained by the structured data processor 106 and the unstructured text processor 108 are provided to the output generator 114. The output generator 114 includes an OCR engine selector 502, a text data normalizer 504, and an entity extractor 506. Using the text region coordinates 510, the OCR engine selector 502 identifies from the document image 120 separate text regions including structured data forms and unstructured floating text for extracting the OCR input 140. The OCR input 140 includes a semantic interpretation of the textual data of the document 110 based on the logical boundaries defined by the document image regions including the various data units.

The text data normalizer 504 normalizes the OCR input 140 to remove null values, and missing values and implement other rule-based cleanings. The OCR input mapper 504 maps the cleaned OCR input to particular cells or regions of the document image 120. In the case of structured data forms, e.g., tables, the mapping may include using the semantic predictions 362 produced by the structured data identification model 162 to identify tabular cells including the column headers and row values. Based on the mappings of the OCR input mapper 504, the entity extractor 508 extracts entities including name-value pairs. In an example, the entity extractor 508 may include a text data comparator 564 which compares textual tokens from the OCR input 140 and their corresponding positions to the known positions of the table headers and rows. The key value generator 566 generates the entities 172 including the column headers as names and row entries as the corresponding values for the names. For unstructured text, natural language processing (NLP) techniques can be employed for entity extraction.

3. Flowcharts

Figure 6:
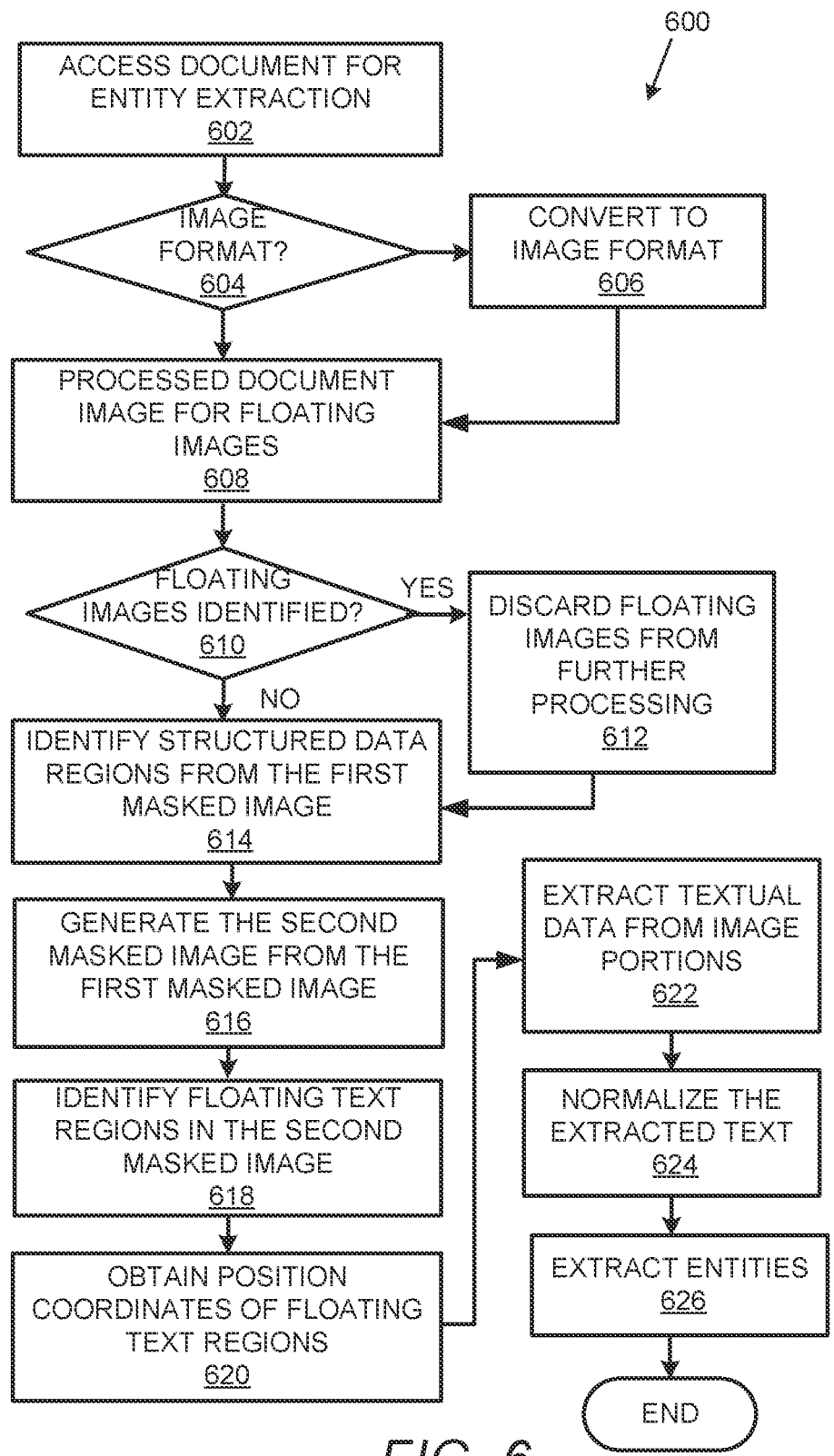
FIG. 6 shows a flowchart of a method of extracting entities from a document in accordance with the examples disclosed herein.

FIG. 6 shows a flowchart 600 of a method of extracting the entities 172 from the document 110 in accordance with the examples disclosed herein. The document 110 is serially processed for identifying and extracting floating images, structured data units and unstructured floating text so that at each stage the processing is made simpler by deleting, discarding, or otherwise disregarding the already-processed data from further analysis. While the method is described serially to initially remove floating images to simplify further processing, it may be appreciated that one of either structured data units or unstructured floating text may be extracted in the second step of the extraction and the remaining type of data units can be extracted in the third step. The method begins at 602 wherein the document 110 to be used for entity extraction is received or accessed. At 604, it is determined if the document 110 is received in an image format. If it is determined at 604 that the document 110 is received as an image, then the document image 120 is further processed else, the process moves to 606 to convert the document 110 into the document image 120 before progressing to 608. In an example, certain fields of the document 110 may be annotated for entity extraction. If however no fields are annotated, the entire document may be selected for entity extraction.

At 608, the document image 120 is processed for floating images, e.g., via the implementation of the connected components process. At 610, it is determined if any floating images are identified. If yes, the method moves to 612, wherein the regions of the document image 120 including the floating images are discarded from further processing by generating the first masked image 122 from the document image 120 by masking the regions including the floating images. In an example, the pixels at the regions including the floating images may be altered into the background color in order to be masked. If it is determined at 610 that no floating images were identified, the method moves to 614, for identifying regions of the document image 120 that include structured data units such as tables, lists, etc. The position coordinates of the regions of the document image 120 including the structured data units are obtained and the second masked image 124 is generated from the first masked image 122 at 616 by masking regions including the structured data units in the first masked image 122. Similarly, the method moves to 618 to identify from the document image 120, regions including unstructured floating text. The coordinates of the image regions including the unstructured floating text are obtained at 620. At 622, textual data is extracted from the various image portions or the corresponding regions including the unstructured floating text via OCR techniques. The different regions of the document image 120 can be provided to an external OCR engine for text extraction. In an example, different OCR engines may be selected for text extraction from different image regions depending on various factors such as domain, language, or the image region including structured data units or floating text. In an example, the OCR engine may also be part of the document processing system 100. Generally, OCR processes the text from left to right. In the present instance, OCR is applied to different regions of the document image 120 in accordance with the position coordinates derived from the analysis of the document image 120, thereby increasing the accuracy of text extraction as compared to tight left-to-right text extraction. The extracted text is normalized at 624 and various entities can be extracted from the normalized the text at 626.

Figure 7:
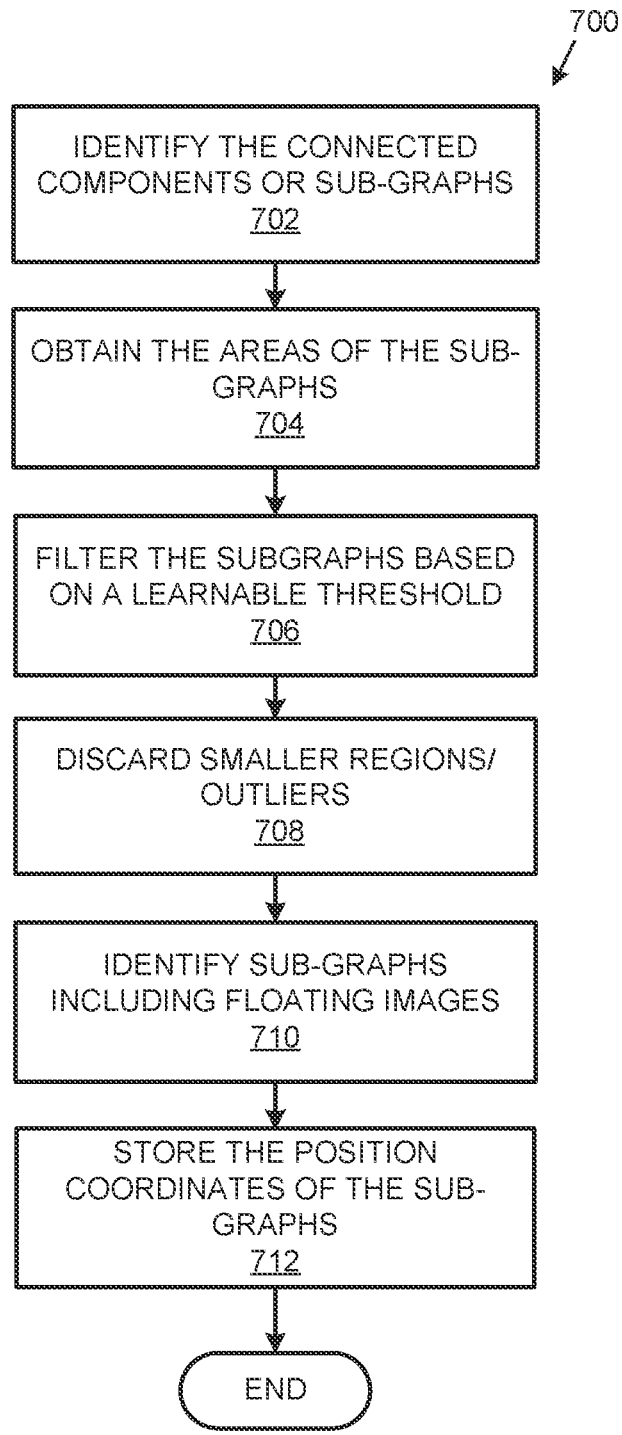
FIG. 7 shows a flowchart of a method of identifying and extracting floating images in accordance with the examples disclosed herein.

FIG. 7 shows a flowchart 700 of a method of identifying and extracting floating images in accordance with the examples disclosed herein. At 702, the connected components or sub-graphs in the document image are identified. Particularly, the document image 120 can be analyzed in terms of sub-graphs $G_1, G_2, \ldots G_n$ with each:

$$G = (V, E),$$ Eq: (1), where

V: a group of pixels $v_1, v_2, \ldots v_m$; and

E: a group of edges where an edge $e_{ij}=1$ iff, $v_i$ and $v_j$ share the same pixel intensity value.

At 704, the areas $A_1, A_2, \ldots A_n$ of the sub-graphs are obtained. At 706, the regions or sub-graphs are filtered based on a learnable threshold $T_h$ where:

$$A_{th} = \sum_{i=0}^{n} A_i \begin{cases} \text{if } A_i \geq T_h \\ \text{else } 0 \end{cases} \quad \text{Eq. (2)}$$

$$A_{sm} = \sum_{i=0}^{n} A_i \begin{cases} \text{if } A_i < T_h \\ \text{else } 0 \end{cases} \quad \text{Eq. (3)}$$

$$Avg_{th} = \frac{A_{th}}{|A_{th}|} \quad \text{Eq. (4)}$$

$$Avg_{sm} = \frac{A_{sm}}{|A_{sm}|} \quad \text{Eq. (5)}$$

In the equations above, $A_{th}$ represents the area of the sub-graphs greater than the threshold area $T_h$, and $A_{sm}$ represents an area of sub-graphs smaller than the threshold area $T_h$. At 708, the smaller regions/outliers $S_{th}$ below the threshold $T_h$ are discarded as shown in Eq. (6) below:

$$S_{th} = ((Avg_{th}/A_{sm})*Avg_{sm}) + (A_{th}/\text{dots\_per\_inch}) \quad \text{Eq. (6)}$$

At 710, the regions or sub-graphs of the document image including the floating images are identified as those included in each sub-graph $G_i$ with area $A_i$ greater than the outlier $S_{th}$:

$$\text{Floating images} = \{\forall G_i \in G \text{ if } A_i > S_{th}\} \quad \text{Eq. (7)}$$

At 712, the position coordinates of each of the sub-graphs which include positions of pixels of the floating image(s) on the document 110 are stored, for example, in the data storage 170, so that the regions of the document image 120 corresponding to the sub-graph position coordinates which would include the pixels of the floating image(s) can be discarded from further processing, thereby clearing up the document image 120 for more accurate data extraction.

Figure 8:
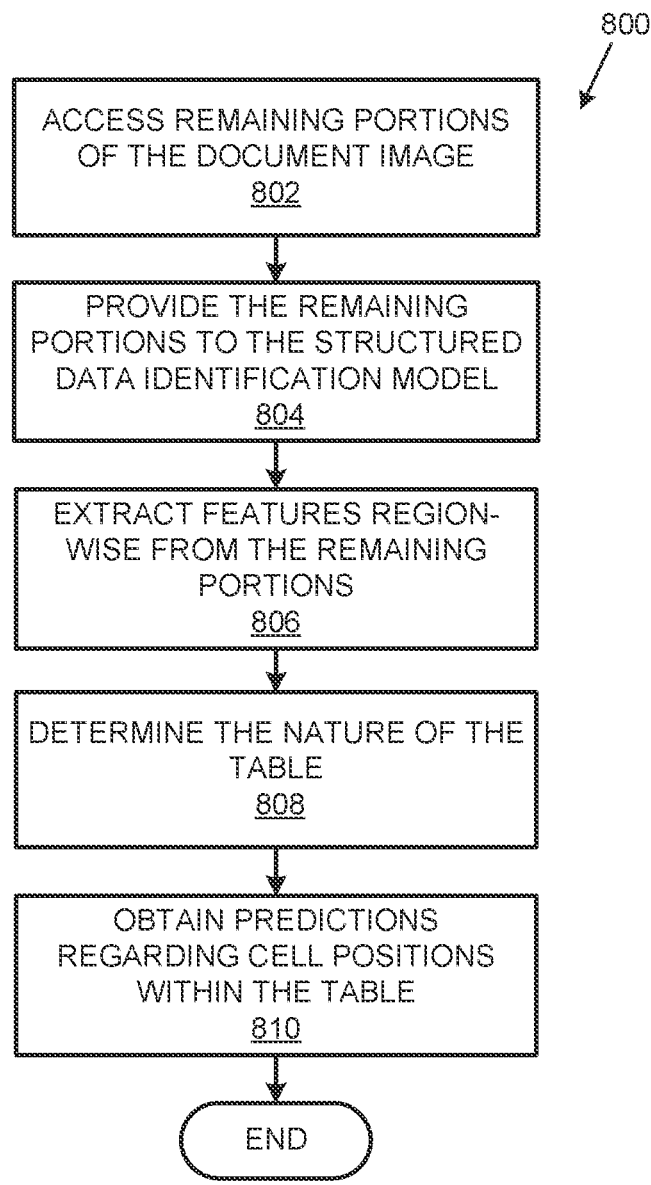
FIG. 8 shows a flowchart of a method of identifying and extracting structured data units in accordance with the examples disclosed herein.

FIG. 8 shows a flowchart of a method of identifying and extracting structured data units from the document image 120 in accordance with the examples disclosed herein. At 802, the remaining portions of the document image 120 other than those including floating images are accessed. At 804, the remaining portions of the document image 120 are provided for processing to the structured data identification model 162 wherein convolutions are applied. At 806, features are extracted region-wise through pooling. The extracted features may include but are not limited to, column entropy (to differentiate between columns like genders with limited values vs. names which may have many unique values), features containing statistical measures of unique characters, alphabets, special characters, numerals, etc. At 808, the nature of the table e.g., whether bordered, semi-bordered or borderless table. At 810, predictions regarding positions are obtained for the cell regions among the bordered, semi-bordered or borderless tables.

Figure 9:
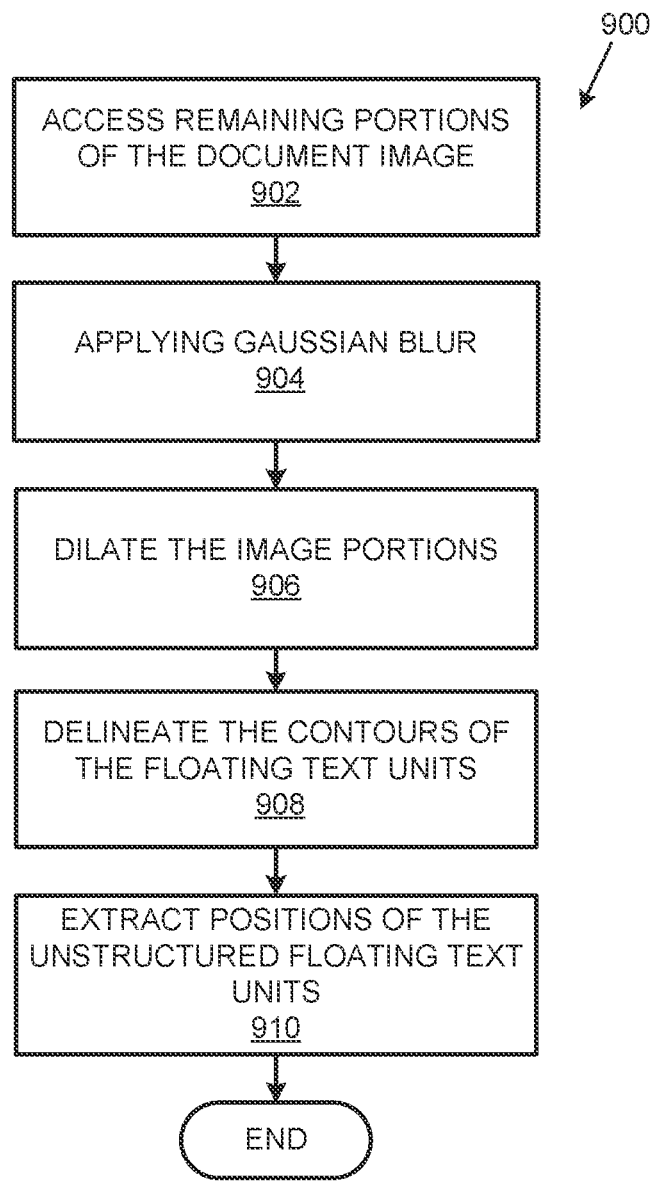
FIG. 9 shows a flowchart of a method of identifying and extracting unstructured floating text in accordance with the examples disclosed herein.

FIG. 9 shows a flowchart of a method of identifying and extracting unstructured floating text in the document image 120 in accordance with the examples disclosed herein. At 902, the portions of the document image 120 that remain after removing the floating image(s) and the structured data units are accessed. At 904, Gaussian blur is applied to the remaining image portions to reduce noise. The document image 120 is convolved with a Gaussian filter which is a low-pass filter that removes the high-frequency components. At 906, the image portions are dilated so that objects in the white shades increase in size, and the sizes of objects in black shades are automatically decreased. At 908, the contours of the floating text units are delineated and the positions of the floating text segments are extracted at 910.

Figure 10:
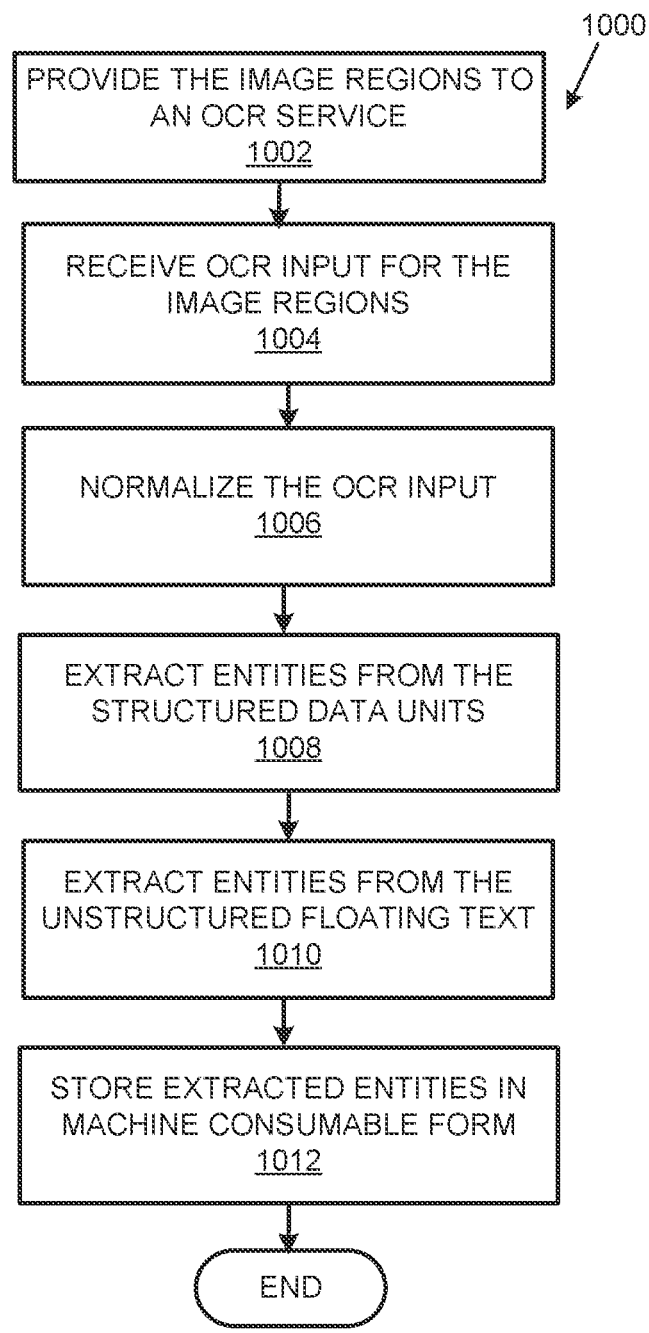
FIG. 10 shows a flowchart of extracting entities in accordance with the examples disclosed herein.

FIG. 10 shows a flowchart of extracting entities from the document image 120 in accordance with the examples disclosed herein. At 1002, the various image regions of the document image 120 predicted to include the structured data units and the unstructured floating text are provided to an OCR service. At 1004, the OCR input 140 is obtained for the image regions. At 1006, the OCR input is normalized to remove null values, duplicate values, etc. At 1008, the entities including key-value pairs for the structured data units are extracted wherein based on the mapping of the region coordinates of the table, headers of the table as keys, and rows of the table as values corresponding to the keys. At 1010, the entities are extracted from the OCR input corresponding to the unstructured floating text regions via NLP techniques using combinations of conditional random fields (CRF), regex (for generic entities like currencies, dates, etc.), fuzzy match, Long Short Term Memory-Conditional Random Fields (LSTM-CRF) (if long text is present), etc. At 1012, the extracted entities may be stored in machine-consumable data formats for downstream processes. In an example, the entities 172 may be transformed into eXtensible Markup Language (XML) format, for storing as simple text, etc.

FIG. 11A shows floating image extraction in accordance with the examples disclosed herein. An example document 1100 includes a floating image of a signature 1102 which is extracted using the connected components method described herein. The version 1104 of the document shows the remaining portion of the document 1110 to be further processed after disregarding the floating image from further processing.

FIG. 11B shows structured data unit extraction in accordance with the examples disclosed herein. The version 1104 of the example document 1100 shows the remaining portions including the structured data unit 1112 which is extracted as three different tables 1114, 1116, and 1118. The unstructured floating text is identified from the remainder of the version 1104 after disregarding the floating image and the structured data units.

Figure 11C:
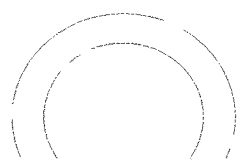
FIG. 11C shows the identification and extraction of unstructured floating text in accordance with the examples disclosed herein.

FIG. 11C shows the identification and extraction of unstructured floating text 1150 from the example document 1100. As mentioned above, the image portions 1150 of the document that remain after the extraction of the floating image(s) and the structured data units are used for extracting unstructured floating text. The contours 1152 of the unstructured floating text units are determined and NLP techniques are applied for entity extraction from the unstructured floating text.

4. System Diagram

Figure 12:
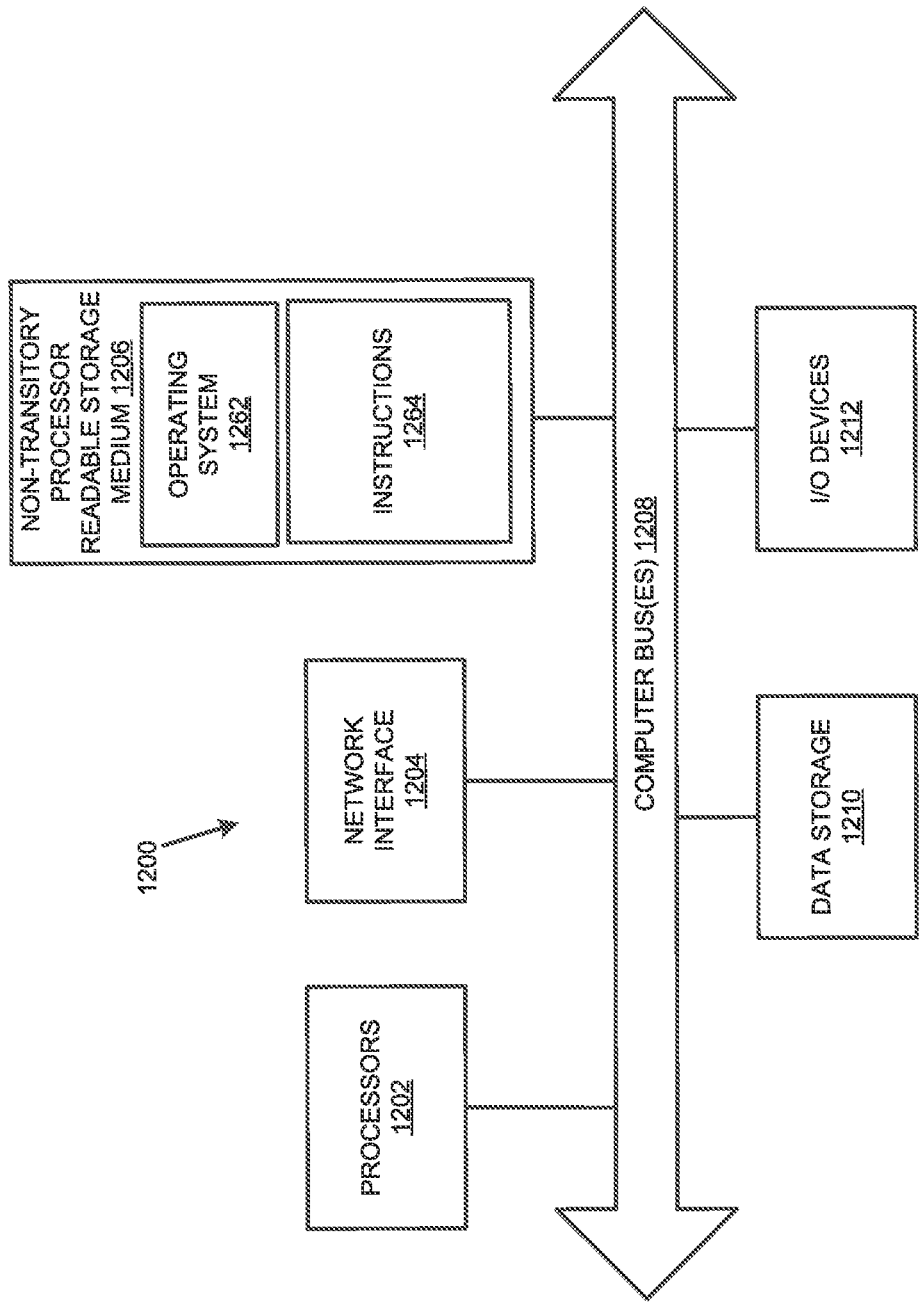
FIG. 12 illustrates a computer system that may be used to implement the document processing system in accordance with the examples disclosed herein.

FIG. 12 illustrates a computer system 1200 that may be used to implement the data processing system 100 in accordance with the examples disclosed herein. More particularly, computing machines such as desktops, laptops, smartphones, tablets, and wearables which may be used to generate or access the data from the data processing system 100 may have the structure of the computer system 1200. The computer system 1200 may include additional components not shown and some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output (I/O) devices 1212, such as a display, mouse keyboard, etc., a network interface 1204, such as a Local Area Network (LAN), a wireless 802.11x LAN, a 3G, 4G or 5G mobile WAN or a WiMax WAN, and a processor-readable medium 1206. Each of these components may be operatively coupled to a bus 1208. The processor-readable or computer-readable medium 1206 may be any suitable medium that participates in providing instructions to the processor(s) 1202 for execution. For example, the processor-readable medium 1206 may be a non-transitory or non-volatile medium, such as a magnetic disk or solid-state non-volatile memory, or a volatile medium such as RAM. The instructions or modules stored on the processor-readable medium 1206 may include machine-readable instructions 1264 executed by the processor(s) 1202 that cause the processor(s) 1202 to perform the methods and functions of the data processing system 100.

The data processing system 100 may be implemented as software or machine-readable instructions stored on a non-transitory processor-readable storage medium and executed by one or more processors 1202. For example, the computer-readable storage medium or non-transitory processor-readable medium 1206 may store an operating system 1262, such as MAC OS, MS WINDOWS, UNIX, or LINUX, and code/instructions 1264 for the data processing system 100. The operating system 1262 may be multi-user, multiprocessing, multitasking, multithreading, real-time, and the like. For example, during runtime, the operating system 1262 is running and the code for the Data processing system 100 is executed by the processor(s) 1202.

The computer system 1200 may include a data storage 1210, which may include non-volatile data storage. The data storage 1210 stores any data used by the data processing system 100. The data storage 1210 may be used as a local data storage of the data processing system 100 to store the document 110, the document image 120, and portions of the document image 120 as various documents are processed and the extracted entities.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A document processing system, comprising:
   at least one processor;
   a non-transitory, processor-readable medium storing machine-readable instructions that cause the at least one processor to:
   access an image of a document that includes a plurality of data units;
   implement a connected components process that analyzes the image of the document as a series of sub-graphs;
   determine that the plurality of data units includes at least one floating image based on the connected components process;
   disregard the at least one floating image from further processing;
   identify serially, one of a structured data unit and unstructured floating text from a first masked image and a second masked image generated from the first masked image;
   identify corresponding regions of the document image including one or more of the structured data unit and the unstructured floating text;
   obtain optical character recognition (OCR) input from the corresponding document image regions including the one or more of the structured data unit and the unstructured floating text,
   wherein the OCR input includes textual data obtained based on a semantic context derived from logical boundaries defined by the corresponding document image regions; and
   generate machine-consumable data set including entities extracted from the OCR input.

2. The document processing system of claim 1, wherein the non-transitory, processor-readable medium stores further machine-readable instructions that cause the at least one processor to:
   determine a format of the document; and
   convert the document into the document image if it is determined that the document is not in an image format.

3. The document processing system of claim 1, wherein to implement the connected components process, the at least one processor executes instructions to:
   identify the series of sub-graphs including pixels;
   compare an extent of the pixels with a predetermined, learnable threshold; and
   identify the floating image in the document image based on the comparison.

4. The document processing system of claim 3, wherein to generate the second masked image from the first masked image, the at least one processor executes instructions to:
   mask the pixels including the structured data unit in the first masked image.

5. The document processing system of claim 1, wherein to identify the structured data unit, the at least one processor implements a convolution neural network (CNN) as a structured data identification model with transfer learning wherein the CNN includes a shared encoder with shared weights.

6. The document processing system of claim 5, wherein to identify the structured data unit, the at least one processor executes instructions to:
   configure the CNN with region-wise feature extraction using pooling.

7. The document processing system of claim 6, wherein to identify the structured data unit, the at least one processor executes instructions to:
   receive output from the CNN indicative of whether a region of the document includes a table, wherein coordinates of the table are mapped to the image of the document, and wherein semantic prediction, instance prediction, and instance regression from the CNN are fused in the output.

8. The document processing system of claim 7, wherein to generate the machine-consumable data set including the entities, the at least one processor is to:
   identify, based on the mapping of the coordinates of the table, headers of the table as keys, and rows of the table as values corresponding to the keys wherein the entities include key-value pairs.

9. The document processing system of claim 1, wherein to identify one of the structured data unit and the unstructured floating text from a remaining portion of the document after disregarding the floating image from further processing, the at least one processor is to:
   initially identify if the structured data unit is included in the document, and if the structured data unit is identified in the document, identify the corresponding document image regions including the structured data unit, and then identify if the unstructured floating text is included in a remaining portion of the document image after the structured data unit is discarded from further processing.

10. The document processing system of claim 1, wherein to identify one of the structured data unit and the unstructured floating text from a remaining portion of the document after disregarding the floating image from further processing, the at least one processor is to:

execute the steps of identifying the corresponding document image regions including the unstructured floating text if the structured data unit cannot be identified in the document.

11. The document processing system of claim 10, wherein to identify the unstructured floating text the at least one processor is to:

apply Gaussian blur and dilation to an image portion of the document that remains after the floating image and the structured data are discarded from further processing.

12. The document processing system of claim 11, wherein to identify the unstructured floating text the at least one processor is to:

detect contours of text segments of the unstructured floating text.

13. A method of data processing comprising:

accessing an image of a document including a plurality of data units;

obtaining a document image by converting the document into an image format;

implementing a connected components process that analyzes the document image as a series of sub-graphs;

determining that the plurality of data units includes at least one floating image based on the connected components process;

disregarding the at least one floating image from further processing;

identifying serially, one of a structured data unit and unstructured floating text from a first masked image and a second masked image generated from the first masked image;

identifying corresponding regions of the document image including one or more of the structured data unit and the unstructured floating text;

obtaining optical character recognition (OCR) input from the corresponding document image regions including the one or more of the structured data unit and the unstructured floating text, wherein the OCR input includes textual data obtained based on a semantic context derived from logical boundaries defined by the corresponding document image regions; and generating machine-consumable data set including entities extracted from the OCR input.

14. The method of claim 13, further comprising:

identifying the at least one floating image from the document image, wherein the identifying includes creating the sub-graphs from groups of pixels in the document image;

calculating areas of the sub-graphs; and identifying the at least one floating image based on the areas of the sub-graphs.

15. The method of claim 13, further comprising:

extracting a position of the unstructured floating text from the second masked image.

16. The method of claim 15, wherein extracting the position of the unstructured floating text further comprises:

generating the second masked image from the first masked image; and applying Gaussian blur and dilating the second masked image.

17. The method of claim 16, wherein extracting the position of the unstructured floating text further comprises:

detecting contours of text segments of the unstructured floating text in the remaining portion of the document image.

18. A non-transitory processor-readable storage medium comprising machine-readable instructions that cause a processor to:

access an image of a document that includes a plurality of data units;

implement a connected components process that analyzes the image of the document as a series of sub-graphs;

determine that the plurality of data units includes at least one floating image based on the connected components process;

disregard the at least one floating image from further processing;

identify serially, one of a structured data unit and unstructured floating text from a first masked image and a second masked image generated from the first masked image;

identify corresponding regions of the document image including one or more of the structured data unit and the unstructured floating text;

obtain optical character recognition (OCR) input from the corresponding document image regions including the one or more of the structured data unit and the unstructured floating text, wherein the OCR input includes textual data obtained based on a semantic context derived from logical boundaries defined by the corresponding document image regions; and generate machine-consumable data set including entities extracted from the OCR input.

19. The non-transitory processor-readable storage medium of claim 18, wherein identifying one of the structured data unit and the unstructured floating text includes further instructions that cause the processor to:

identify, using a structured data identification model, the structured data unit including a table, wherein the structured data identification model includes a convolution neural network (CNN); and identify the table as one of a bordered table, a semi-bordered table, and a borderless table.

20. The non-transitory processor-readable storage medium of claim 19, wherein identifying the table includes further instructions that cause the processor to:

train the CNN on labeled training data including bordered tables, semi bordered tables, and borderless tables.

* * * * *